(12) United States Patent
Mizutani et al.

(10) Patent No.: US 9,645,283 B2
(45) Date of Patent: May 9, 2017

(54) WEATHER PREDICTION APPARATUS AND WEATHER PREDICTION METHOD

(71) Applicants: Kabushiki Kaisha Toshiba, Minato-ku (JP); Chuden CTI Co., Ltd., Nagoya-shi (JP)

(72) Inventors: Fumihiko Mizutani, Yokohama (JP); Ryuichi Muto, Tokyo (JP); Atsushi Sakakibara, Nagoya (JP); Daisuke Monoe, Nagoya (JP); Aimi Kobayashi, Nagoya (JP)

(73) Assignees: KABUSHIKI KAISHA TOSHIBA, Minato-ku (JP); Chuden CTI Co., Ltd., Nagoya-shi (JP)

(*) Notice: Subject to any disclaimer, the term of this patent is extended or adjusted under 35 U.S.C. 154(b) by 0 days.

(21) Appl. No.: 14/323,276

(22) Filed: Jul. 3, 2014

(65) Prior Publication Data

US 2014/0316704 A1   Oct. 23, 2014

Related U.S. Application Data

(63) Continuation of application No. PCT/JP2013/054012, filed on Feb. 19, 2013.

(30) Foreign Application Priority Data

Feb. 20, 2012   (JP) .................... 2012-034367

(51) Int. Cl.
 *G01W 1/10* (2006.01)
 *G06Q 10/04* (2012.01)

(52) U.S. Cl.
 CPC .............. *G01W 1/10* (2013.01); *G06Q 10/04* (2013.01)

(58) Field of Classification Search
 CPC ....................................................... G01W 1/10
 See application file for complete search history.

(56) References Cited

U.S. PATENT DOCUMENTS

| | | |
|---|---|---|
| 6,850,184 B1 * | 2/2005 | Desrochers et al. ........ 342/26 D |
| 2004/0054476 A1 * | 3/2004 | Ohba et al. ...................... 702/3 |

(Continued)

FOREIGN PATENT DOCUMENTS

| | | |
|---|---|---|
| CN | 1566993 | 1/2005 |
| JP | 2000-187082 A | 7/2000 |

(Continued)

OTHER PUBLICATIONS

Torres et al., Super Resolution for the NEXRAD Network, http://http://www.nwas.org/committees/rs/NEXRAD_Super_Resolution_Newsletter_Article.pdf, Dec. 21, 2008.*

(Continued)

*Primary Examiner* — Manuel Rivera Vargas
(74) *Attorney, Agent, or Firm* — Oblon, McClelland, Maier & Neustadt, L.L.P.

(57) ABSTRACT

According to an embodiment, weather prediction apparatus divides prediction target area into grids and performs weather prediction for each grid. The apparatus includes receiver, calculator and corrector. Receiver receives observation value in each grid at a first time interval. Calculator sets first observation value received by receiver as initial value and calculates prediction value in each grid using advection model at a second time interval shorter than first time interval. When receiver receives second observation value after first observation value, corrector corrects advection model based on difference between second observation value and prediction value corresponding to observation time of second observation value.

11 Claims, 4 Drawing Sheets

(56) References Cited

U.S. PATENT DOCUMENTS

2007/0244644 A1 10/2007 Tanahashi
2008/0097701 A1* 4/2008 Zawadzki et al. .............. 702/3

FOREIGN PATENT DOCUMENTS

| | | |
|---|---|---|
| JP | 3727762 B2 | 10/2005 |
| JP | 2005-351866 A | 12/2005 |
| JP | 2007-187478 A | 7/2007 |
| JP | 2007-285773 A | 11/2007 |
| TV | 576985 | 2/2004 |

OTHER PUBLICATIONS

Lazarus et al., Analysis of the Gal-Chen-Zhang Single-Doppler Velocity Retrieval, Journal of Atmospheric and Oceanic Technology, vol. 16, pp. 5-18, Jan. 1999.*
Bermejo et al., A Conservative Quasi-Monotone Semi-Lagrangian Scheme, Monthly Weather Review, Volumd 130, pp. 423-430, Feb. 2002.*
International Preliminary Report on Patentability and Written Opinion issued on Sep. 4, 2014, in PCT/JP2013/054012 submitting English translation.
International Search Report mailed Apr. 16, 2013 for PCT/JP2013/054012 filed Feb. 19, 2013 with English Translation.
International Written Opinion mailed Apr. 16, 2013 for PCT/JP2013/054012 filed Feb. 19, 2013.
Yasuto Tachikawa, et al., "Modeling Error Structure of Prediction Rainfall Area by Advection Model and Generation of Rainfall Area," Annual Report of Kyoto University Disaster Prevention Research Institute, Apr. 2002, N. 45 B-2 http://www.dpri.hyoto-u.ac.jp/nenpo/no45/02b/b10/pdf (Please note that Japanese Office Action with English translation in which Reference AW was cited in corresponding JP2014-500716 was previously submitted Apr. 15, 2016.)
Extended European Search Report issued Sep. 8, 2015 in Patent Application No. 13752228.0.
Office Action issued Mar. 1, 2016 in Japanese Patent Application No. 2014-500716 (with English Translation).
Chinese Office Action mailed Sep. 25, 2015, in Patent Application No. 201380004713.9 with English translation.
Office Action mailed Apr. 14, 2016 in Chinese Patent Application No. 201380004713.9 (with English Translation).
Office Action issued Oct. 9, 2016 in Chinese Patent Application No. 201380004713.9 (with English language translation).

* cited by examiner

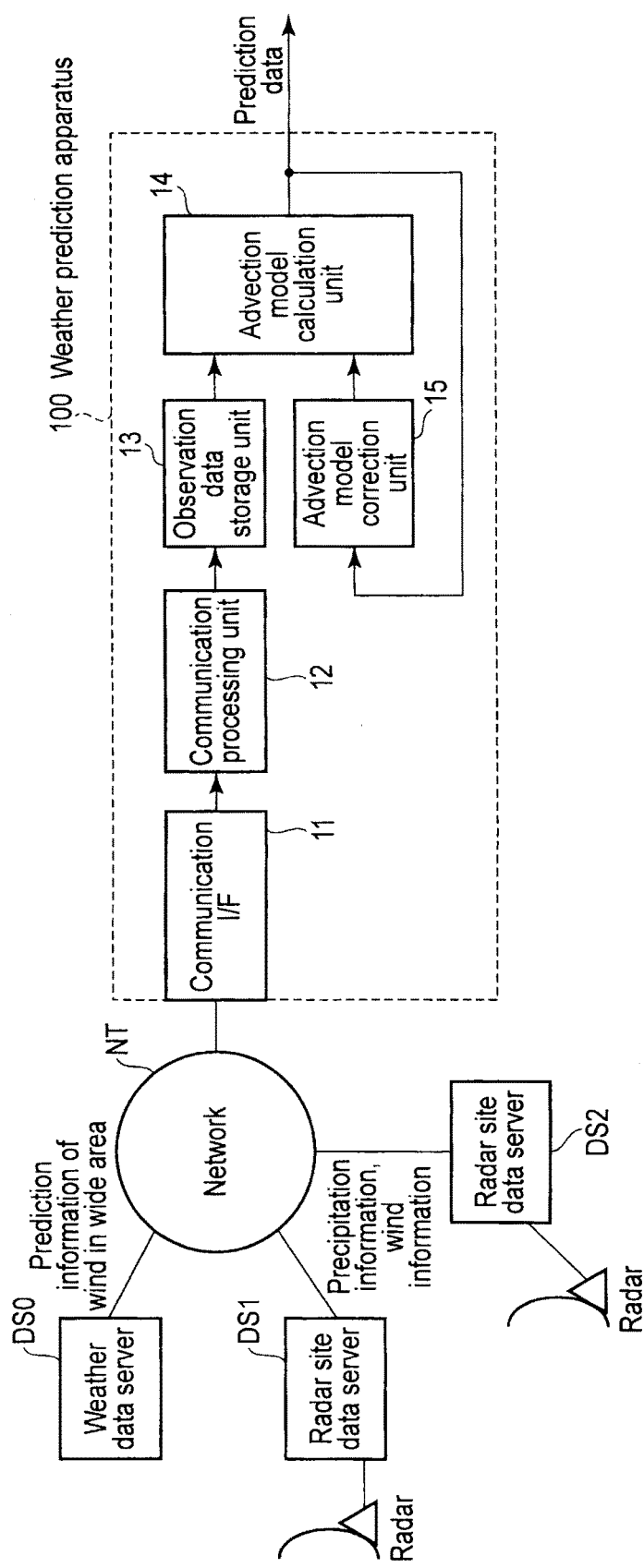
F I G. 1

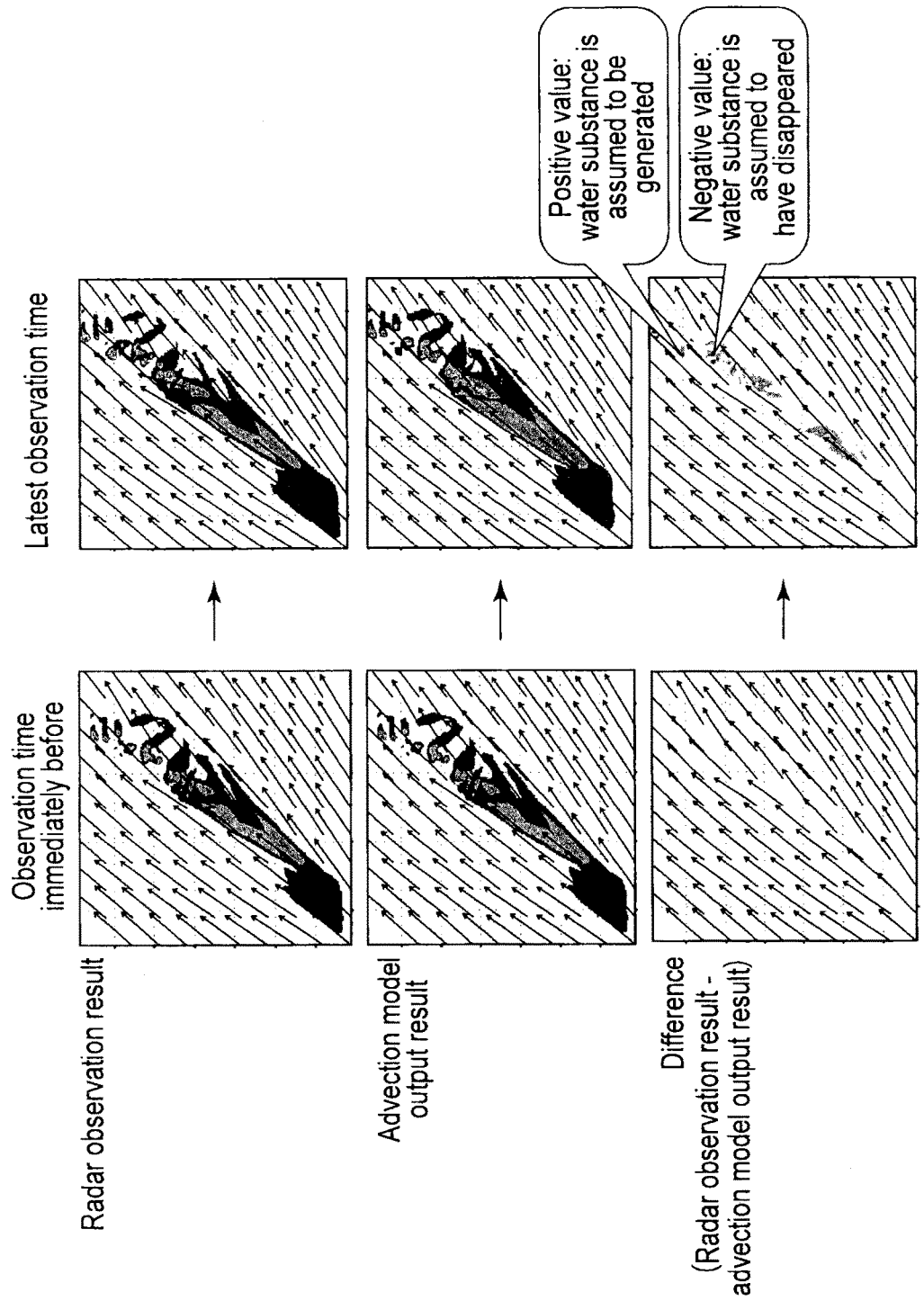

WEATHER PREDICTION APPARATUS AND WEATHER PREDICTION METHOD

CROSS-REFERENCE TO RELATED APPLICATION

This application is a Continuation Application of PCT Application No. PCT/JP2013/054012, filed Feb. 19, 2013 and based upon and claiming the benefit of priority from prior Japanese Patent Application No. 2012-034367, filed Feb. 20, 2012, the entire contents of all of which are incorporated herein by reference.

FIELD

Embodiments described herein relate generally to a weather prediction apparatus and a weather prediction method.

BACKGROUND

A conventional weather prediction system predicts weather by calculating the atmospheric flow using observation data obtained by a weather radar and the like, GPV (Grid Point Value) data provided by the Japan Meteorological Agency, and the like. However, this system is not effective in predicting, for example, cumulonimbus clouds which grow abruptly because of a long time interval of observation data acquisition.

In the conventional technique, since the time interval of observation data acquisition is long, a difference is generated between observation data and prediction data, and the reliability of prediction information is lost.

BRIEF DESCRIPTION OF THE DRAWINGS

FIG. 1 is a block diagram showing the arrangement of a weather prediction apparatus according to an embodiment;

FIG. 4 is a view showing an example of an advection calculation result.

DETAILED DESCRIPTION

Figure 2:
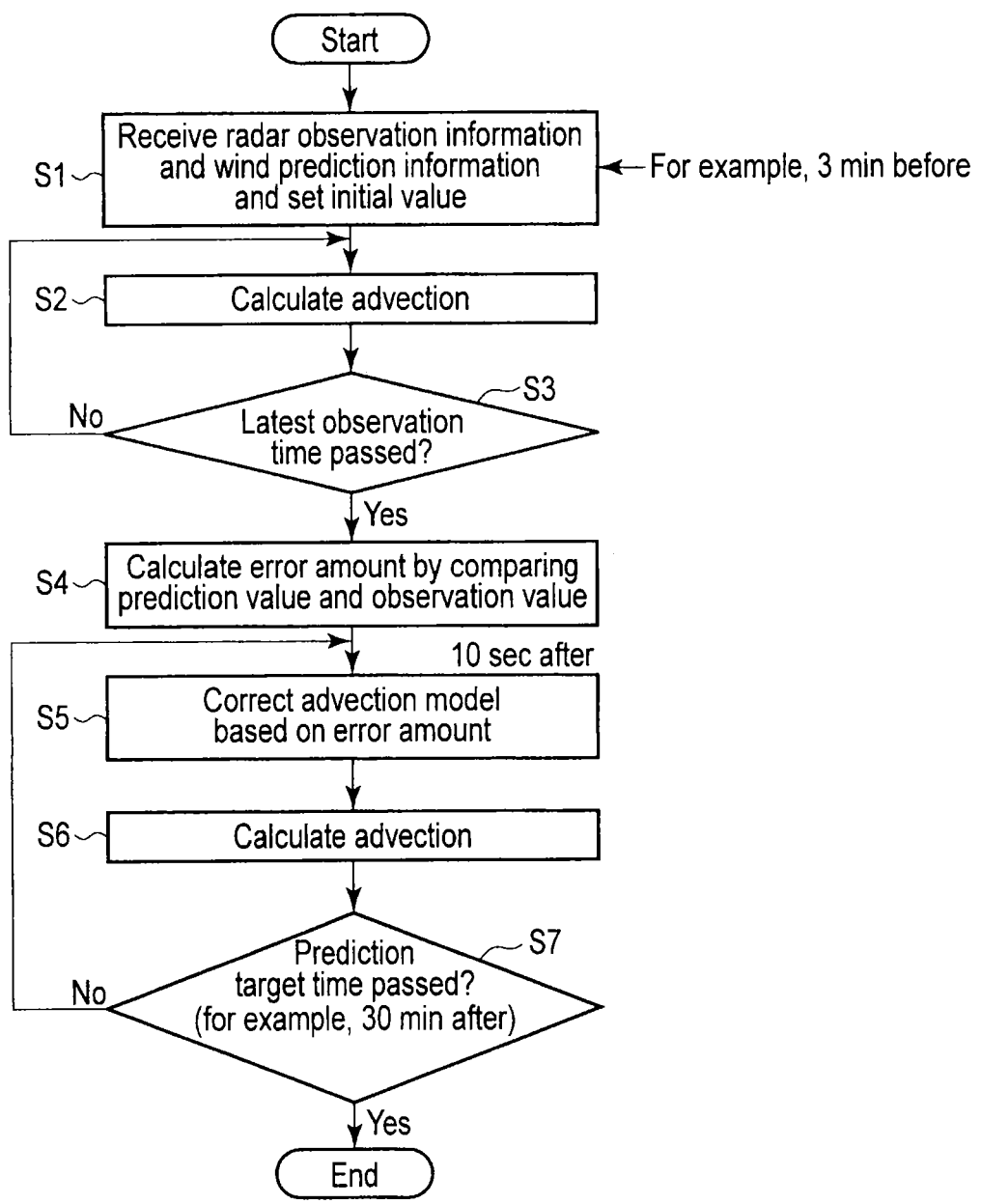
FIG. 2 is a flowchart showing weather prediction calculation processing.

In general, according to an embodiment, a weather prediction apparatus divides a prediction target area into grids and performs weather prediction for each grid. The apparatus includes a receiver, an advection model calculator and a corrector. The receiver receives an observation value in each grid at a first time interval. The advection model calculator sets a first observation value received by the receiver as an initial value and calculates a prediction value in each grid using an advection model at a second time interval shorter than the first time interval. When the receiver receives a second observation value after the first observation value, the corrector corrects the advection model based on a difference between the second observation value and the prediction value corresponding to an observation time of the second observation value.

A weather prediction apparatus and a weather prediction method according to an embodiment will now be described with reference to the accompanying drawings.

FIG. 1 is a block diagram showing the arrangement of a weather prediction apparatus according to this embodiment. A weather prediction apparatus 100 includes a communication interface 11, a communication processing unit 12, an observation data storage unit 13, an advection model calculation unit 14, and an advection model correction unit 15. The weather prediction apparatus 100 is connected to a network NT via the communication interface 11 and communicates with a weather data server DS0 and radar site data servers DS1 and DS2 on the network NT.

The communication processing unit 12 receives weather observation information observed by weather radars from the radar site data servers DS1 and DS2 via the network NT. For example, the communication processing unit 12 receives precipitation information and wind information (radar observation information) of each grid formed by dividing a prediction target area into grids from the radar site data servers DS1 and DS2 every, for example, 3 min (first time interval). For example, from a mechanical scanning antenna of a large parabolic antenna type having the time resolution and spatial resolution of a radar and used in a nationwide observation network, the communication processing unit 12 can receive radar observation information in a mesh of about 1 km every 3 to 5 min. From a phased array weather radar, the communication processing unit 12 can receive radar observation information in a mesh of about 100 to 250 m every 10 to 30 sec across a coverage of 20 to 60 km. The communication processing unit 12 also receives prediction information of wind (wind information of GPV data) in a wide area distributed from the weather data server DS0. The weather observation data received by the communication processing unit 12 is stored in the observation data storage unit 13.

The advection model calculation unit 14 sets the observation value (first observation value) stored in the observation data storage unit 13 as an initial value, and calculates and outputs a prediction value of each grid that equals the spatial resolution of the radar every, for example, 10 sec (second time interval) using an advection model.

When the communication processing unit 12 receives a second observation value after the first observation value, the advection model correction unit 15 corrects the advection model based on the difference between the second observation value and the prediction value obtained by the advection model calculation unit 14 in correspondence with the observation time of the second observation value.

Figure 3:
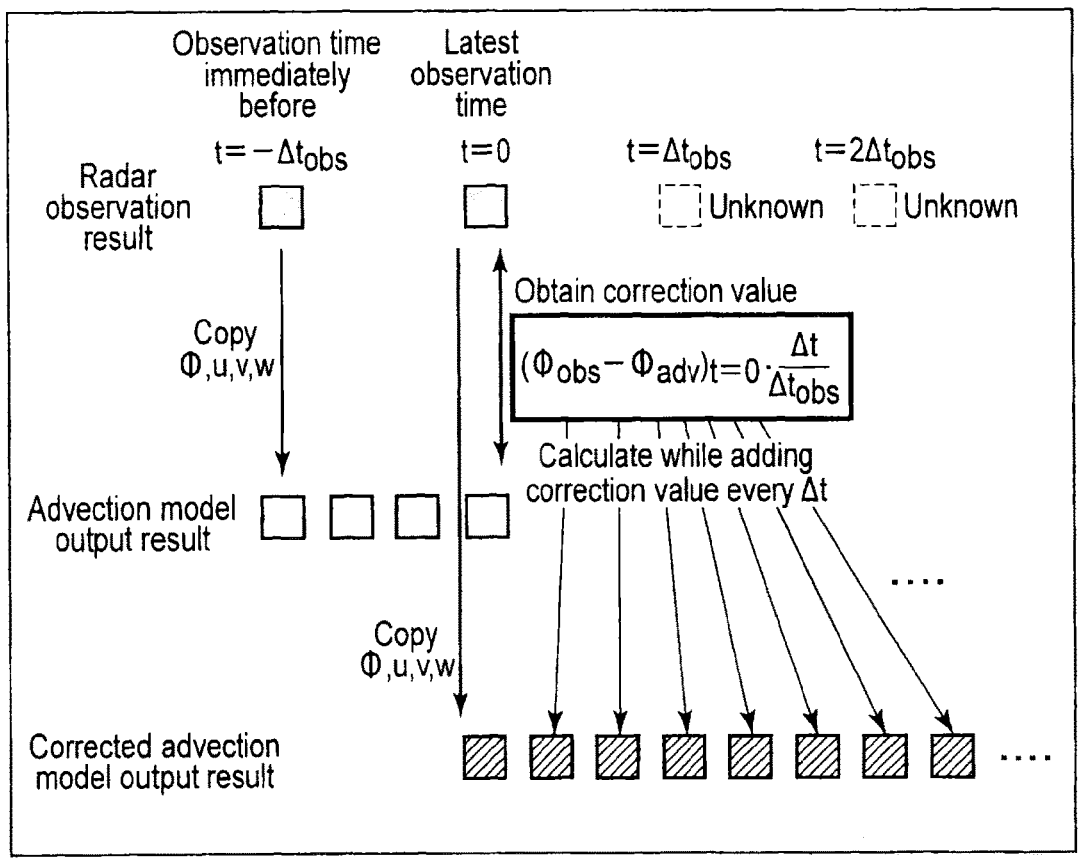
FIG. 3 is a view schematically showing advection calculation processing.

The operation of the weather prediction apparatus 100 having the above-described arrangement will be explained next. FIG. 2 is a flowchart showing weather prediction calculation processing. FIG. 3 is a view schematically showing advection calculation processing.

In the weather prediction apparatus 100, the communication processing unit 12 receives radar observation information and wind information of GPV data every, for example, 3 min and stores them in the observation data storage unit 13. The advection model calculation unit 14 sets physical quantity (water substance distribution and wind direction and speed distribution) obtained from the observation result immediately before (3 min before) as initial values (step S1).

The advection model calculation unit 14 performs predictive calculation of the water substance in each grid using an advection model (step S2). The advection model calculation unit 14 repetitively performs the predictive calculation using the advection model in step S2 every, for example, 10 sec until the latest observation time is passed (step S3). For example, the three-dimensional CUL (Cubic Lagrange) method is used as the advection model, and the wind direction and speed are assumed to be constant along with the progression of time. Note that this system is also applicable to a case where the wind direction and speed change along with the progression of time. For example, when handling data having a high spatial resolution, like phased array radar data, a wind direction and speed obtained using the VVP (Volume Velocity Processing) method or Gal-Chen method, which is a three-dimensional wind analysis method, can be used as the wind direction and speed of the advection model.

When the latest observation time is passed (YES in step S3), the advection model correction unit 15 obtains, at each lattice point, the difference (error amount) between the water substance observation result at the observation time and the water substance prediction result of the advection model corresponding to the observation time (step S4). The advection model correction unit 15 corrects the advection model based on the error amount obtained in step S4 (step S5). For example, the advection model correction unit 15 calculates a correction value per unit time from the error amount obtained in step S4, and adds it to the advection model every, for example, 10 sec (second time interval Δt), as shown in FIG. 3.

FIG. 4 is a view showing an example of a prediction result by an advection model. In this embodiment, assume that the water substance is generated at a position where the value of (observation result−prediction result of advection model) is positive, and the water substance disappears at a position where the value is negative, as shown in FIG. 4. Assuming that the water substance generation and disappearance continuously occur at the same positions in the same amounts for the next ten minutes, the water substance generation and disappearance amount per unit time is set as the correction value.

The corrected advection model is obtained by adding the correction term obtained in step S5 to the advection model. More specifically, it can be expressed as following equations.

$$\phi_{adv}^{t0}\big|_{i,j,k}^{t+\Delta t} = CUL_3\big(\phi_{adv}^{t0}\big|^t, u^{t0}, v^{t0}, w^{t0}\big)_{i,j,k} \quad \text{[Mathematical 1]}$$

$$\phi_{pred}^{t0}\big|_{i,j,k}^{t+\Delta t} = CUL_3\big(\phi_{pred}^{t0}\big|^t, u^{t0}, v^{t0}, w^{t0}\big)_{i,j,k} + Adj.\phi\big|_{i,j,k}^{t0} \cdot \Delta t$$

$$Adj.\phi\big|_{i,j,k}^{t} = \frac{\phi_{obs}\big|_{i,j,k}^{t} - \phi_{adv}^{t-\Delta t_{obs}}\big|_{i,j,k}^{t}}{\Delta t_{obs}}$$

$\phi_{obs}$: Observation value
$\phi_{adv}^{t}$: Advection model value using time t as initial value
$\phi_{pred}^{t}$: Corrected advection model value using time t as initial value
$CUL_3$ : Advection model (three dimensional CUL method)
Adj.φ: Correction value
$\Delta t_{obs}$: First time interval
Δt: Second time interval As shown in FIG. 3, the advection model calculation unit 14 performs predictive calculation using the corrected advection model until the prediction target time (for example, 30 min ahead) while setting the water substance observation result at the latest observation time as the initial value (steps S6 and S7). The advection model calculation unit 14 outputs the prediction result in step S6 as a water substance prediction value.

As described above, in the above-described embodiment, prediction is performed using an advection model serving as a base while correcting the advection model based on the difference between an observation value and a prediction value by the advection model. This arrangement makes it possible to increase the accuracy of short-time weather prediction and properly predict, for example, cumulonimbus clouds which grow abruptly.

In the above embodiment, precipitation prediction has been exemplified. The distribution of pollen, yellow sand, dust, contaminant in the atmosphere, or the like can also be predicted. It is also possible to predict the distribution of plankton or oil spills in the sea or the distribution of a chemical substance or the like discharged into a river by using the speed of the flow of the sea or river instead of the wind speed.

While certain embodiments of the inventions have been described, these embodiments have been presented by way of examples only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The appended claims and their equivalents are intended to cover such forms or modifications as would fall within the scope and spirit of the inventions.

What is claimed is:

1. A weather prediction apparatus comprising:
communication circuitry configured to receive weather observation information observed by a weather radar at a first time interval, the weather observation information including precipitation information for each grid of a plurality of grids formed by dividing a prediction target area;
a memory configured to store an observation value in each grid based on the weather observation information, the observation value including a physical quantity of a water substance;
advection model calculation circuitry configured to set a first observation value as an initial value from the memory and perform predictive calculation for an advection of the water substance in each grid using an advection model for calculating a prediction value of the advection at a second time interval shorter than the first time interval; and
advection model correction circuitry configured to correct the advection model by adding, every predetermined time, a correction value based on a difference between a second observation value obtained after the first observation value and the prediction value corresponding to an observation time of the second observation value, the correction value corresponding to a generation and disappearance amount of the water substance per unit time.

2. The weather prediction apparatus of claim 1, wherein a grid of the plurality of grids corresponds to a mesh with respect to a spatial resolution of a weather radar.

3. The weather prediction apparatus of claim 1, wherein the advection model uses a three-dimensional Cubic Lagrange method.

4. The weather prediction apparatus of claim 1, wherein the advection model uses one of a Volume Velocity Processing method and a Gal-Chen method.

5. The weather prediction apparatus of claim 1, wherein the predetermined time is the second time interval.

6. The weather prediction apparatus of claim 1, wherein the circuitry is further configured to generate a weather prediction result based on the corrected advection model.

7. A weather prediction method implemented by weather prediction apparatus including circuitry, the weather prediction method comprising:
- receiving weather observation information observed by a weather radar at a first time interval, the weather observation information including precipitation information for each grid of a plurality of grids formed by dividing a prediction target area;
- storing, in a memory, an observation value in each grid based on the weather observation information, the observation value including a physical quantity of a water substance;
- setting, the circuitry of the weather prediction apparatus, a first observation value as an initial value from the memory;
- performing, by the circuitry of the weather prediction apparatus, predictive calculation for an advection of the water substance in each grid using an advection model for calculating a prediction value of the advection at a second time interval shorter than the first time interval; and
- correcting, by the circuitry of the weather prediction apparatus, the advection model by adding, every predetermined time, a correction value based on a difference between a second observation value obtained after the first observation value and the prediction value corresponding to an observation time of the second observation value, the correction value corresponding to a generation and disappearance amount of the water substance per unit time.

8. The weather prediction method of claim 7, wherein a grid of the plurality of grids corresponds to a mesh with respect to a spatial resolution of a weather radar.

9. The weather prediction method of claim 7, wherein the advection model uses a three-dimensional Cubic Lagrange method.

10. The weather prediction method of claim 7, wherein the advection model uses one of a Volume Velocity Processing method and a Gal-Chen method.

11. The weather prediction method of claim 7, wherein the predetermined time is the second time interval.

* * * * *